(12) United States Patent
Parker et al.

(10) Patent No.: US 6,795,854 B1
(45) Date of Patent: Sep. 21, 2004

(54) OPERATING SYSTEM FOR STRUCTURED INFORMATION PROCESSING

(75) Inventors: Simon Parker, Dublin (IE); Diarmuid Micheal MacCarthy, Limerick (IE); Georgina McDaid, Wicklow (IE); Charles Ian Watson, Dublin (IE); Robert Patrick Baker, Dublin (IE); Hugh O'Donoghue, Dublin (IE); Patrick Anthony Warren Buckley, Kerry (IE)

(73) Assignee: Polarlake Limited, Dublin (IE)

( * ) Notice: Subject to any disclaimer, the term of this patent is extended or adjusted under 35 U.S.C. 154(b) by 0 days.

(21) Appl. No.: 09/556,180

(22) Filed: Apr. 21, 2000

(51) Int. Cl.[7] .................. G06F 15/173; G06F 15/16
(52) U.S. Cl. .................. 709/223; 709/230; 707/513; 707/100; 707/10; 715/500; 715/513
(58) Field of Search .................. 709/223, 230, 709/200; 707/10, 100, 513; 715/500, 513

(56) References Cited

U.S. PATENT DOCUMENTS

| | | | | |
|---|---|---|---|---|
| 5,740,384 A | * | 4/1998 | Asthana et al. | 710/305 |
| 5,870,605 A | | 2/1999 | Bracho et al. | |
| 5,991,520 A | * | 11/1999 | Smyers et al. | 710/100 |
| 6,021,443 A | | 2/2000 | Bracho et al. | |
| 6,125,391 A | * | 9/2000 | Meltzer et al. | 709/223 |
| 6,243,783 B1 | * | 6/2001 | Smyers et al. | 710/310 |
| 6,282,268 B1 | * | 8/2001 | Hughes et al. | 379/88.03 |
| 6,356,906 B1 | * | 3/2002 | Lippert et al. | 707/10 |
| 6,405,237 B1 | * | 6/2002 | Khalidi et al. | 709/203 |
| 6,470,384 B1 | * | 10/2002 | O'Brien et al. | 709/223 |

* cited by examiner

Primary Examiner—Hosain Alam
Assistant Examiner—Shabana Qureshi
(74) Attorney, Agent, or Firm—Law Offices of Imam

(57) ABSTRACT

An embodiment of the present invention includes an extensible and dynamic software operating environment supporting applications which process structured information, and particularly an environment supporting XML processors.

22 Claims, 9 Drawing Sheets

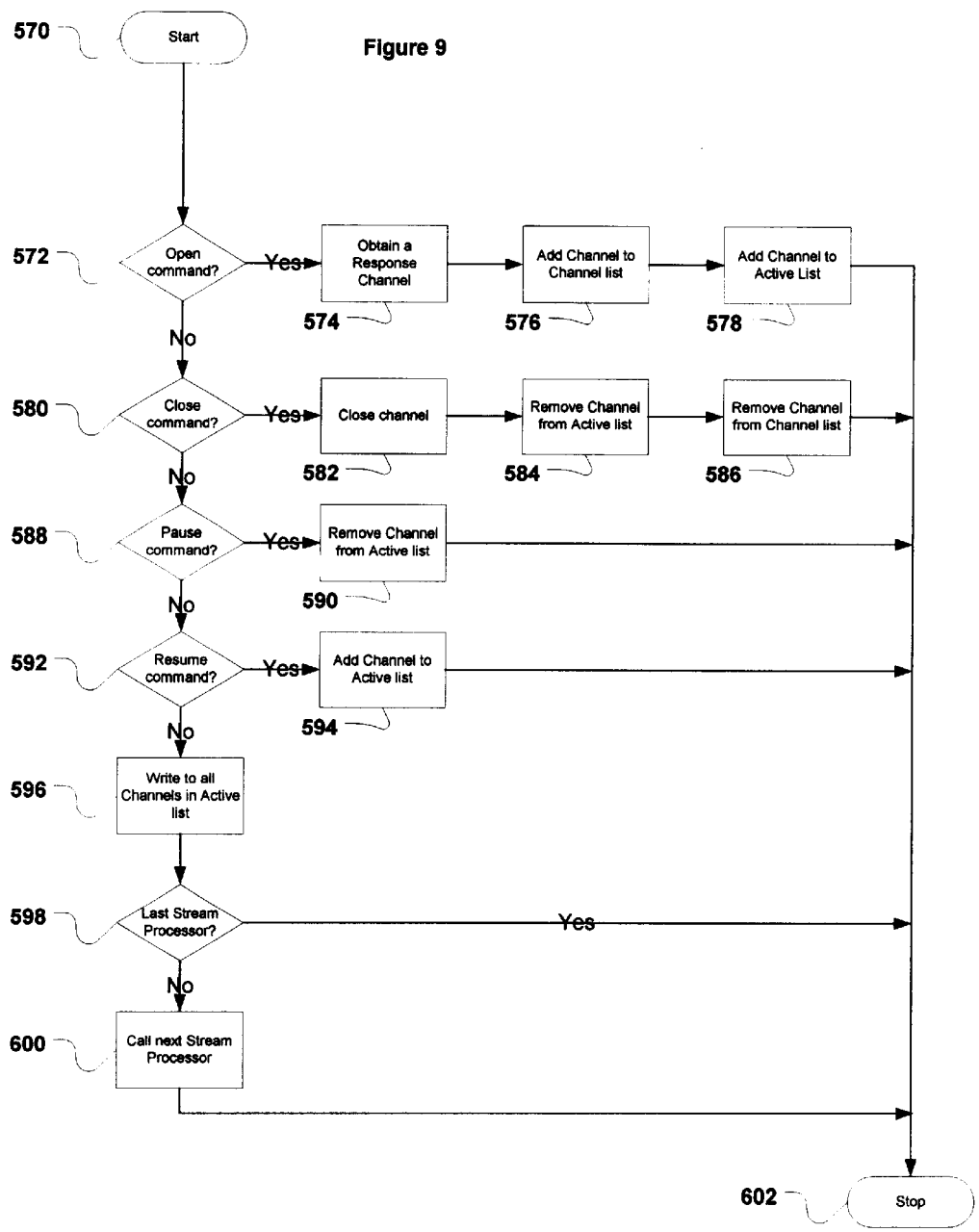

OPERATING SYSTEM FOR STRUCTURED INFORMATION PROCESSING

BACKGROUND OF THE INVENTION

1. Field of the Invention

The present invention relates generally to an extensible and dynamic software operating environment supporting applications which process structured information, and particularly to an environment supporting XML processors.

2. Description of the Prior Art

A computer system comprises hardware and software arranged to store and process data. The hardware of a typical computer system includes a central processing unit (CPU), memory, external storage, data input devices, data output devices and data communication devices.

The CPU can manipulate data, which resides in memory, move data between memory and external storage, and control the other devices. Instructions, which also reside in memory, direct the CPU to perform these actions. The CPU fetches instructions from memory and executes them one by one. A program is a sequence of instructions to accomplish some task, and the term software denotes programs in general.

In a computer system data is encoded in a form the computer can manipulate efficiently, usually as groups of binary digits. In external storage, data is organized in larger units known as files. Programs which are not being executed may reside in memory or in external storage, and can be treated as data.

In the early days of computing, each program had to manage the computer as well as doing its own work. Programs had to contain detailed instructions to control devices, handle errors, communicate with the operator, and clean up afterwards.

These housekeeping chores made programs inflexible and fragile. The programmer had to know which devices were attached to the computer, where the data was stored, how much memory would be available and how to send messages to the operator. The program could not run on a different computer, and if the hardware changed the program would stop working. The solution was to divide the work between two kinds of software: system programs and application programs.

System programs are written by programmers who understand the computer hardware. An operating system is a collection of system programs, which manage a computer. When a new device is added to the computer a new system program is added to the operating system.

Application programs ('applications') are written by programmers who understand the job the computer system is to accomplish. The operating system provides a complete environment for the application. When the application needs to perform some hardware operation such as reading or writing data or communicating with the operator, it calls the operating system to help.

When one program calls another program there is an interface between them. In many cases the details of the interface don't matter, but if different programmers are involved, or if many programs will call each other in similar ways, the interface is important and must be specified precisely. In this case it is called an Application Programming Interface (API). An operating system has an API.

It is often necessary to transport data from one computer to another. A simple method uses a portable storage medium such as a diskette. The sending computer writes data to the diskette using an output device, the diskette is physically transported to the receiving computer, and the receiving computer reads the data from the diskette using an input device.

A more convenient method is to connect the two computers by cable. The sending computer uses a data communication device to write data to the cable, and the receiving computer uses a similar device to read data from the cable.

Such an arrangement works in both directions. Each computer can send and receive, but they must ensure that when one is sending the other is receiving. They do this by agreeing to follow a protocol.

Communication between two computers is useful, but communication between several computers is even better. Three or more computers can share one cable, and when one computer sends data all the other computers receive it. This is called broadcasting, and a group of computers which are connected like this is called a broadcast network.

A more complicated protocol is needed for broadcast communication. In particular, it is necessary to assign a unique address to each computer. Whenever one computer sends data to another computer it includes its own address and the receiver's address. All the computers hear the transmission, but they all ignore it except the receiver.

Broadcast communication works well if the number of parties is limited. When two broadcast networks must be connected to each other, it is better to let one computer in each network handle external communication.

A computer which performs this role on behalf of a network is called a router. The routers are connected to each other directly. When a sender broadcasts data for a different network the router sends it to the other router. The other router sends it to the receiver.

The two broadcast networks and the link between them form a routed network, called an 'internet'. This internet may be connected to other internets to form a bigger network, and so on. The Internet is an example of a large public internet.

Routed networks need more complicated transport protocols and addresses than broadcast networks. The most widely adopted protocol and addressing scheme is the Internet Protocol (IP).

IP helps routers to move data around networks, and provides a foundation for a family of protocols for specialized communication. Transmission Control Protocol (TCP) guarantees a reliable channel between two applications on different computers. Simple Mail Transport Protocol (SMTP) uses TCP to move electronic mail from one computer to another. Hypertext Transport Protocol (HTTP), also based on TCP, forms the basis of the World Wide Web and is widely supported. File Transfer Protocol (FTP) uses two or more TCP connections to move files between computers.

Computer systems can only work with data, but people are interested in the information which that data represents.

Here is some data, represented as a sequence of characters:

DUB200003220620030000EI123HTWONTIME08001

A human observer might detect patterns in the data, and obtain some information by inference and guesswork. Sophisticated computer systems have been designed to do the same, though not so well. For ordinary purposes however, computers and humans need some clues about the structure and context. Here is the same data, structured as a

DUB,200003220620030000,EI123,HTW,ONTIME,
0800,1 sequence of elements:

Structuring the data in this way helps somewhat. It can be seen that the last element is the number 1, the second element might be a date and '123' belongs with 'EI' in the third element.

The context in which this data should be interpreted is: "Airline flight status". Now, the three-character airport references are clear, and the flight number EI123. This still does not explain the meaning of the last two fields.

The information this data actually represents is:

'Aer Lingus flight EI123 from Dublin to Heathrow at 06:20:03 GMT on $22^{nd}$ Mar. 2000 landed on time at 08:00, and is assigned to terminal 1.'

This free text representation makes the information very clear to humans—at least, to those who understand a little about air travel and the English language. It is not easy for computers, however, because the structure has been lost.

Markup languages offer a powerful compromise between the information content of free text and the fixed structures that computer systems need. Here is the same information expressed using Extensible Markup Language (XML).

```
<FLIGHT-EVENT>
    <ORIGIN>DUB</ORIGIN>
    <FLIGHT-TIME>Wed Mar 22 06:20:03 GMT
    2000</FLIGHT-TIME>
    <FLIGHT-NUMBER>EI123</FLIGHT-NUMBER>
    <DESTINATION>HTW</DESTINATION>
    <STATUS>ONTIME</STATUS>
    <ARRIVAL-TIME>08:00</ARRIVAL-TIME>
    <TERMINAL>1</TERMINAL>
</FLIGHT-EVENT>
```

An XML document comprises elements, and each element is introduced by a start tag containing a name and followed by an end tag containing the same name prefixed by a forward slash. Tags are delimited by angle brackets. Elements may contain text or other elements. In the example above, element STATUS contains the text ONTIME, and element FLIGHT-EVENT contains seven other elements.

An application which processes XML must be prepared to undertake many tasks. It will have to obtain the document as a stream of characters from the network or from external storage, scan the document looking for special characters such as the angle brackets which delimit tags, extract element names and the text contents, ensure there is an end tag for each start tag and ensure the elements are properly nested. To write an XML document an application must assemble elements, properly nested and in the correct order, format the tags and write characters to external storage or the network.

If the application's job is simply to identify flights from Dublin, or send a message whenever the status of a flight changes, the programmer will want to avoid as much of this housekeeping as possible. One way to do this is to divide the application into several programs, then use programs which have already been written.

A program which reads a stream of characters and identifies tags and elements is called a parser. It is common to use a parser with other programs, and standard interfaces have been designed for XML parsers.

The parser may read the whole document into memory and then supply parts of the document in response to calls from another program. This is the Document Object Model interface (DOM).

Alternatively, the parser may call another program as soon as it recognises something interesting in the character stream. This interface is known as the Simple API for XML (SAX). Each call is known as an event, a sequence of calls is an event stream, and the program which the parser calls is an event processor. An event processor for a small application can be written quickly, and a programmer can build a complex application by assembling a chain of simple event processors.

This approach to application development has potential, but is costly, time-consuming and error-prone at present because of the lack of a supporting software environment. The programmer must still provide the communication, management and housekeeping facilities such software needs, and the resulting application is not as portable or flexible as it could be. What is missing is an operating system for structured information processors.

SUMMARY OF THE INVENTION

Briefly, an embodiment of the present invention includes an extensible and dynamic software operating environment supporting applications which process structured information, and particularly to an environment supporting XML processors.

The foregoing and other objects, features and advantages of the present invention will be apparent from the following detailed description of the preferred embodiments which make reference to several figures of the drawing.

IN THE DRAWINGS

FIGS. 5–9 show flow charts of some of the steps performed by the operating system environment of FIGS. 1–4.

DETAILED DESCRIPTION OF THE PREFERRED EMBODIMENTS

Figure 1:
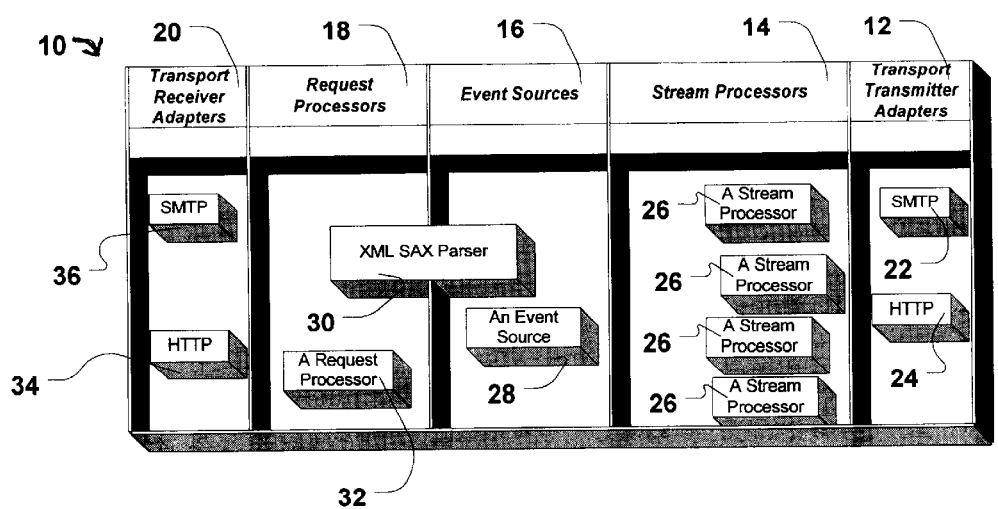
FIG. 1 shows an operating environment in accordance with the present invention.

Referring now to FIG. 1, an operating system environment 10 is shown in accordance with an embodiment of the present invention to include a collection of Transport Transmitter Adapters 12, a collection of Stream Processors 14, a collection of Event Sources 16, a collection of Request Processors 18 and a collection of Transport Receiver Adapters 20.

The collection of Transport Transmitter Adapters 12 is shown to include a HTTP Transport Transmitter Adapter 24 and an SMTP Transport Transmitter Adapter 22. The collection of Stream Processors 14 contains one or more Stream Processors, each labeled as 26. The collection of Event Sources 16 is shown to include an Event Source 28. The collection of Request Processors 18 is shown to include a Request Processor 32. The SAX parser 30 is shown to be included in both the collection of Request Processors 18 and the collection of Event Sources 16. The collection of Transport Receiver Adapters 20 is shown to include a HTTP Transport Receiver Adapter 34 and an SMTP Transport Receiver Adapter 36.

It should be noted that in various embodiments of the present invention, any Request Processor such as 32 can operate successfully with any Transport Receiver Adapter, such as Transport Receiver Adapters 34 or 36. Similarly, any Stream Processor 26 can operate successfully with any Event Source such as Event Source 28 or SAX parser 30.

In one embodiment of the present invention, the Request Processor 30 is a SAX parser for parsing XML documents. In other embodiments of the present invention, other types of structured information may be processed without departing from the spirit and scope of the present invention. Functions of the components shown in FIG. 1 will become more apparent with the following discussion with respect to other figures. As will be apparent from the following discussion, the operating system environment 10 is a dynamic operating environment flexible enough to handle various protocols and structured information processors. In one embodiment of the present invention, the operating environment 10 is used for XML processors.

In operation, information is processed by a combination of processors selected and configured specifically to process the information. It may be received by a Transport Receiver Adapter 34 or 36, then pass through a Request Processor such as the SAX parser 30 and several Stream Processors (26), and finally be sent through a Transport Transmitter Adapter such as 22 or 24.

Figure 2:
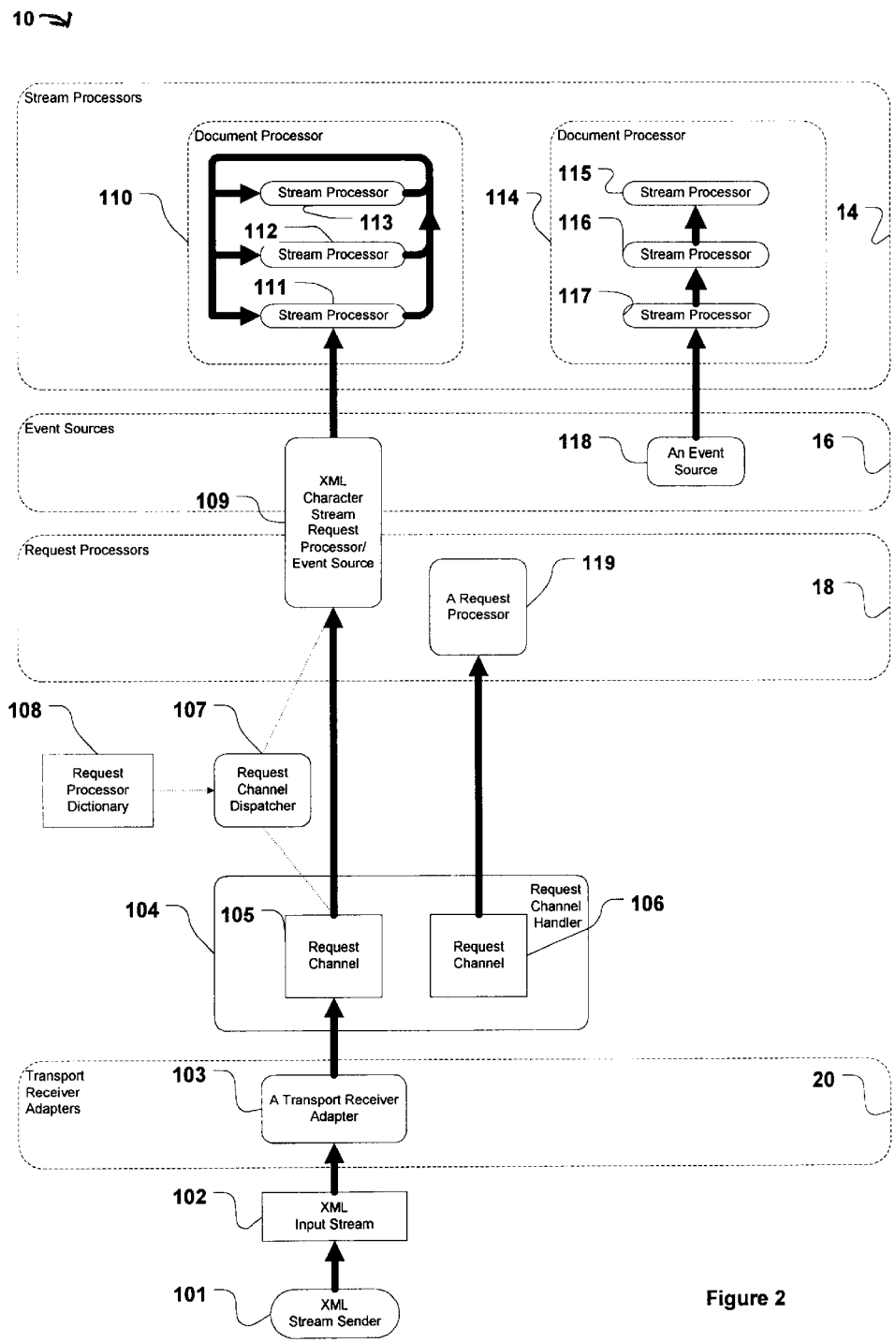
FIG. 2 shows various flows of information from the Transport Receiver Adapters of FIG. 1 to the Stream Processors 14 of FIG. 1.
Figure 3:
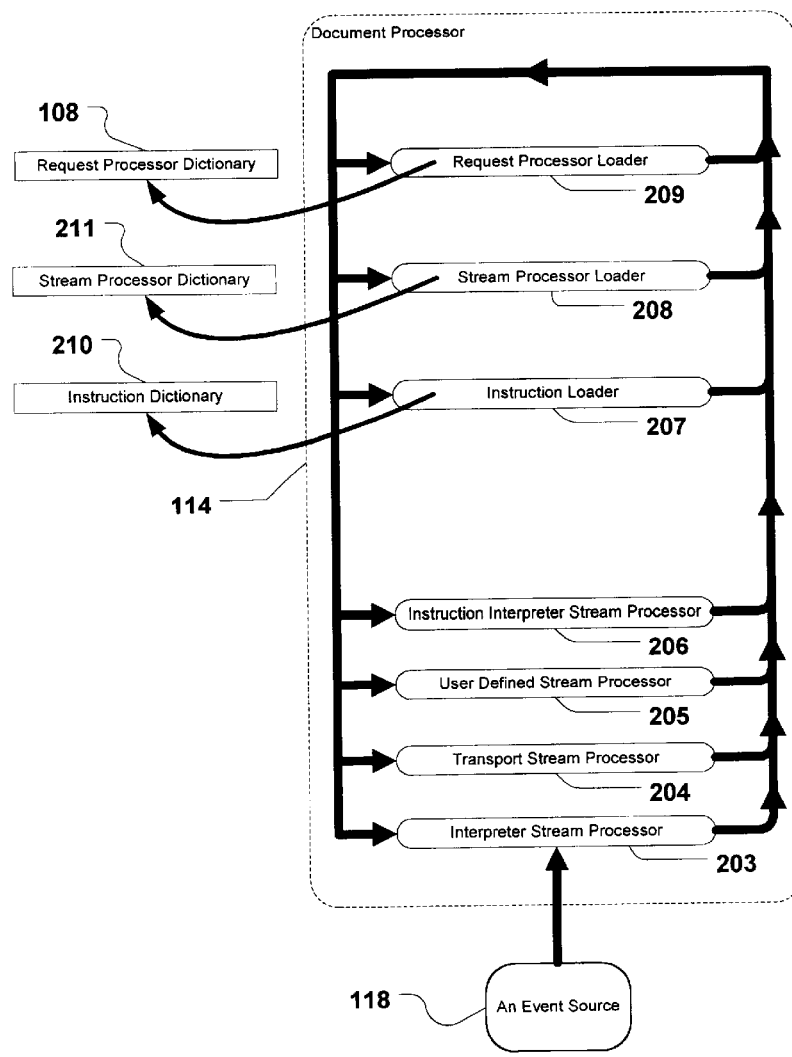
FIG. 3 shows greater detail of one embodiment of the Document Processor 114.
Figure 4:
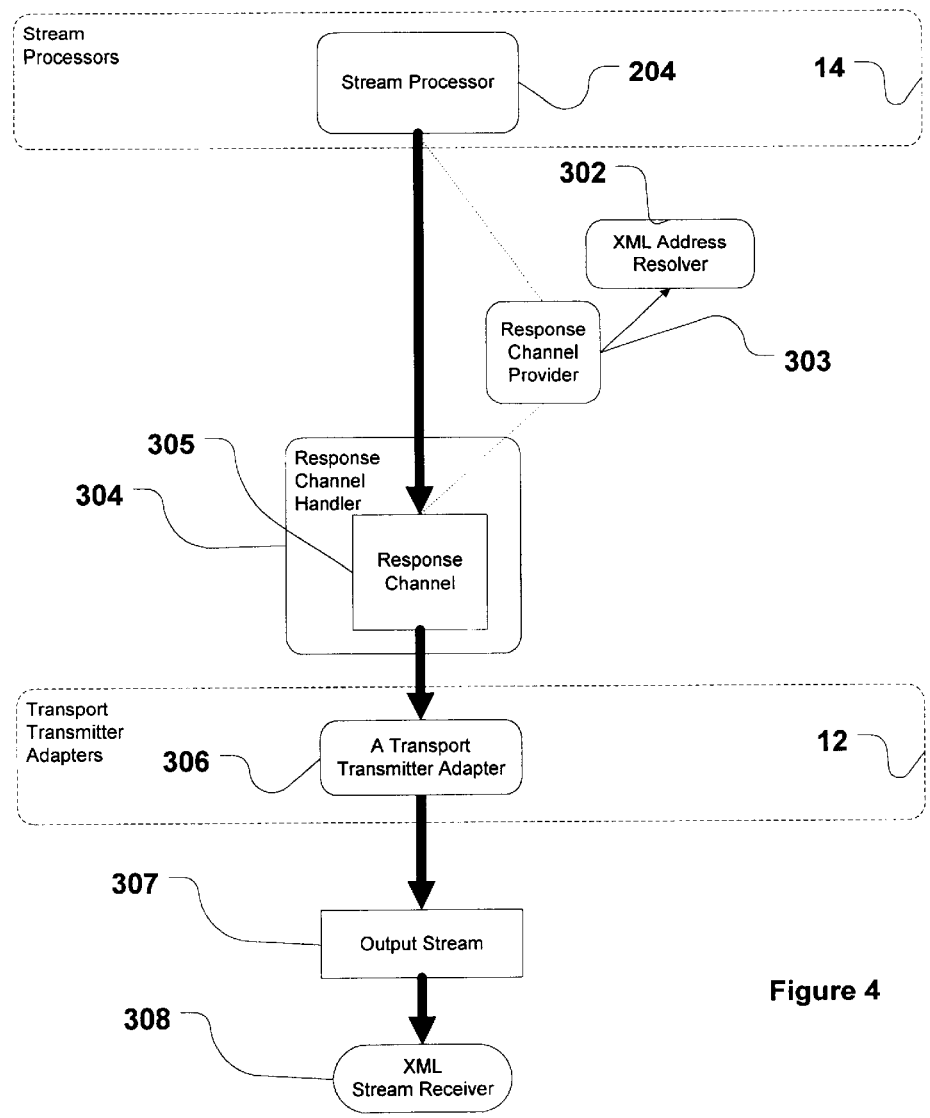
FIG. 4 shows data flow from a Stream Processor out of the operating environment of FIG. 1.

FIGS. 2–4 show further details of the environment 10 by illustrating the flow of information through the environment. FIGS. 2 to 4 merely show one of many embodiments of the present invention. However, it should be appreciated that other known types of processing can be achieved by the present invention without departing from the scope and spirit of the present invention.

In FIG. 2, a flow of information is shown from a Transport Receiver Adapter 103 to a Document Processor 110, and another flow from the Request Channel Handler 104 to a Request Processor 119, and another flow from an Event Source 118 to a Document Processor 114.

In FIG. 2, an XML Stream sender 101 outside the environment produces or forwards an XML document to a Transport Receiver Adapter 103 as a character stream 102 using a transport protocol. Each Transport Receiver Adapter implements one or more transport protocols, and can receive character streams from several sources simultaneously. As soon as the Transport Receiver Adapter begins to receive a character stream it allocates a Request Channel 105 to represent the character stream and passes it to the Request Channel Handler 104. Request Channels allow Request Processors to read character streams without knowing details of the transport protocols used to receive them. A Request Channel is not a permanent part of the operating system. Rather, it represents an incoming document. It is created when the document arrives, and is discarded when the document has been processed. Sometimes there are many channels, with documents at different stages of processing. When the system is idle there are no Request Channels.

In FIG. 2 the Request Channel Dispatcher 107 obtains Request Channel 105 from the Request Channel Handler 104 and allocates it to Request Processor 109. The Request Channel Dispatcher 107 consults the Request Processor Dictionary 108 to select a suitable Request Processor to process each Request Channel. Request Processor 109 was selected for Request Channel 105, and Request Processor 119 was selected for Request Channel 106.

Figure 5:
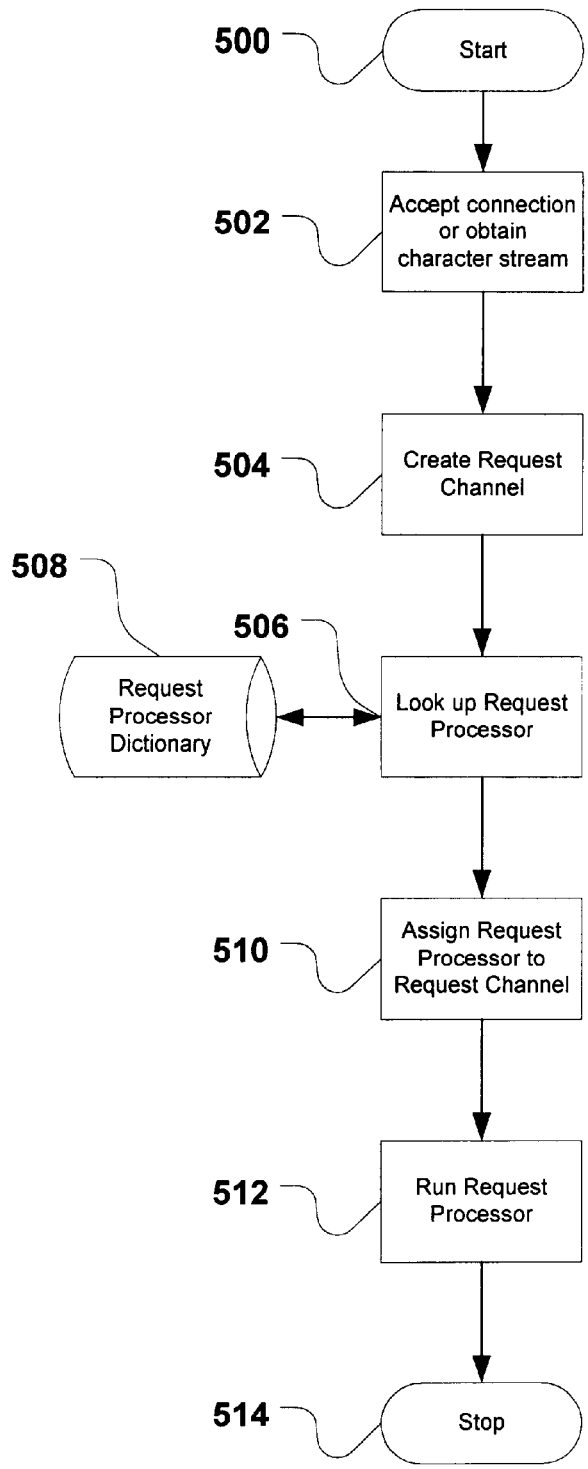

FIG. 5 is a flowchart showing the steps in this process. The process starts at step 500 and continues to step 502 at which point a character stream is obtained or the connection (to the Transport Receiver Adapter) is accepted. Next, at step 504, a Request Channel is created followed by step 506, which searches for a Request Processor using the Request Processor dictionary 508. Next, at step 510, the Request Processor that was found at step 506 is assigned to the Request Channel. Finally, at step 512, the Request Processor is executed and the processing of an incoming character stream is completed at 514.

This allocation mechanism allows the environment to respond to different kinds of information in appropriate ways. The environment can support any number of Request Processors, each enhancing the environment's ability to process Request Channels. Request Processors may be added dynamically at any time.

An application which processes structured information in the form of a character stream can be installed in the environment as a Request Processor. A Request Processor need not pass information to other components of the environment for further processing. In FIG. 2, Request Processor 119 processes the information received from the Request Channel 106.

If further processing is required, the Request Processor converts the incoming character stream (its input received from the Request Channels of the Request Channel handler 104) into an event stream.

An event routine is a software program routine (code) that can be called upon (activated) to represent a particular construct of a document (for example, an XML document). An event stream is an ordered sequence of routine calls (a routine call is activation of the routine) which represent a document. An example of a standard set of event routines used to represent XML documents is specified by the SAX standard.

An application that can generate structured information in the form of an event stream is known as an Event Source. An application that processes structured information in the form of an event stream is known as a Stream Processor. In FIG. 2 Event Source 118 passes an event stream to Stream Processor 117.

Figure 6:
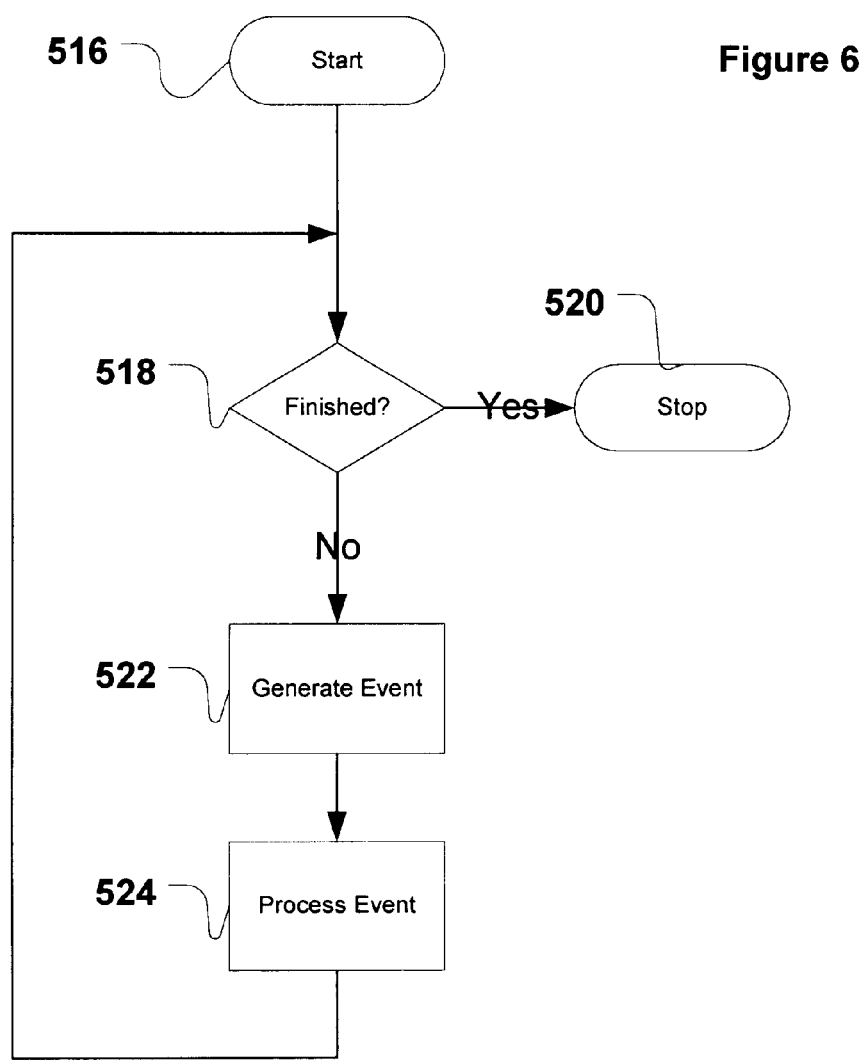

FIG. 6 is a flow chart showing how an Event Source works. At step 518 the Event Source determines whether more events should be generated. If not, the Event Source stops. Otherwise at step 522 the Event Source generates a new event, and at step 524 it processes the new event by calling an Stream Processor. The procedure resumes at step 518.

One of the built-in Request Processors in the XML operating system is the XML character stream Request Processor 109. This processes the XML character stream from a Request Channel 105 using an XML parser and produces an event stream as it parses. The event stream is then passed to the initial Stream Processor in a Document Processor 14, such as Stream Processor 111. This Request Processor is therefore also an Event Source.

A Stream Processor may call another Stream Processor, so the event stream may pass through several Stream Processors. To remove an event from the event stream, a Stream Processor simply neglects to call the next Stream Processor. To insert an event into the event stream, a Stream Processor makes an extra (routine) call to the next Stream Processor. For example, in FIG. 2, the Stream Processor 111 passes events to any of the Stream Processors 111, 112 and 113. Each of the processors 111, 112 and 113, in turn, can pass events to each other. Stream Processor 117 passes events to Stream Processor 116, which passes events to Stream Processor 115.

A Document Processor provides the context in which Stream Processors operate on an event stream. In FIG. 2, Document Processor 110 provides a context for Stream Processors 111, 112 and 113 to operate on the event stream produced by Event Source 109. One or more Stream Processors operate in the context of each Document Processor, depending on the configuration of the operating system and the requirements of the Event Source. In the context of a Document Processor, Stream Processors may be arranged in various configurations. They may process the event stream in series or in parallel. The environment designates one Stream Processor in the context of each Document Processor as the initial Stream Processor. The Event Source passes the event stream to the initial Stream Processor.

FIG. 2 shows two event streams, from Event Sources 109 and 118, each being processed in the context of two Document Processors. The environment creates a Document Processor at the request of an Event Source, and allocates Stream Processors to the Document Processor from the collection of Stream Processors 14. In FIG. 2, Stream Processor 111 is the initial Stream Processor of the Document Processor 110 and Stream Processor 117 is the initial Stream Processor of the Document Processor 114.

It should be understood that FIG. 2 shows a single configuration of the environment 10, which is processing three documents simultaneously. The first document is being read (102) while processor 109 parses it and several Stream Processors (111, 112, 113) are processing it. The Document Processor 110 and the instances of the Stream Processors may have been created just for this event stream, and they may be discarded when the document is finished.

At the same time, Request Channel 106 is now being processed by Request Processor 119.

Also at the same time Event Source 118 is generating events and Stream Processors 115, 116 and 117 are processing the event stream. The Document Processor 114 and the instances of the Stream Processors may have been created just for this event stream, and they may be discarded when the document is finished.

It should also be noted that 112 and 116 might be different instances of the same Stream Processor.

Depending upon the resources available to the operating system and the amount of work it has to do, there may be any number of Document Processors. A particular Document Processor will not handle more than one document at a time, and each document will only pass through one Document Processor.

The dictionaries contain patterns or references to patterns for making instances of various Stream Processors, Request Processors and Instructions. Instances may be created on demand. For example, if five identical documents are received at once, five instances may be created from one Stream Processor pattern to handle the documents.

The ability to build dynamic contexts in which Stream Processors operate provides a powerful and flexible infrastructure for structured information processing applications.

A Stream Processor may respond to events in an event stream in many ways, the following are some of these ways:
Detect structures, patterns, names or keywords within a set of events.
Insert new events into the event stream
Remove events from the event stream
Replicate the event stream or parts thereof, directing each event to several Stream Processors
Communicate with or participate in an external system; for example:
Generate output to a window, a file, a network destination or another system
Call the programming interface of an external system
Access a database for storage or retrieval
Alter the configuration of the Document Processor, or components of the XML Operating System itself
Lookup and invoke built-in or user-defined commands When Stream Processors collaborate to perform some complex task, they may need to communicate with each other. They can use the event stream to carry private information. The sending Stream Processor (upStream Processor) expresses the private information as event routine calls. The receiving Stream Processor (downstream Processor) extracts the information from the event routine calls.

This technique can be used to provide instructions and configuration information to Stream Processors from outside the environment as well as from upStream Processors.

In a typical configuration, the environment contains a set of built-in Stream Processors. These provide basic facilities, including the ability to extend the XML operating system with new Stream Processors.

FIG. 3 shows greater detail of one embodiment of a Document Processor such as 114 in FIG. 2. Document Processor 114 is shown to refer to an instruction dictionary 210, a Stream Processor dictionary 211 and a Request Processor Dictionary 108, and to include a Request Processor loader 209, a Stream Processor loader 208, an instruction loader 207, an instruction Interpreter Stream Processor 206, a user-defined Stream Processor 205, a transport Stream Processor 204 and an Interpreter Stream Processor 203. The Document Processor 114 is shown coupled to the Event Source 118.

Figure 7:
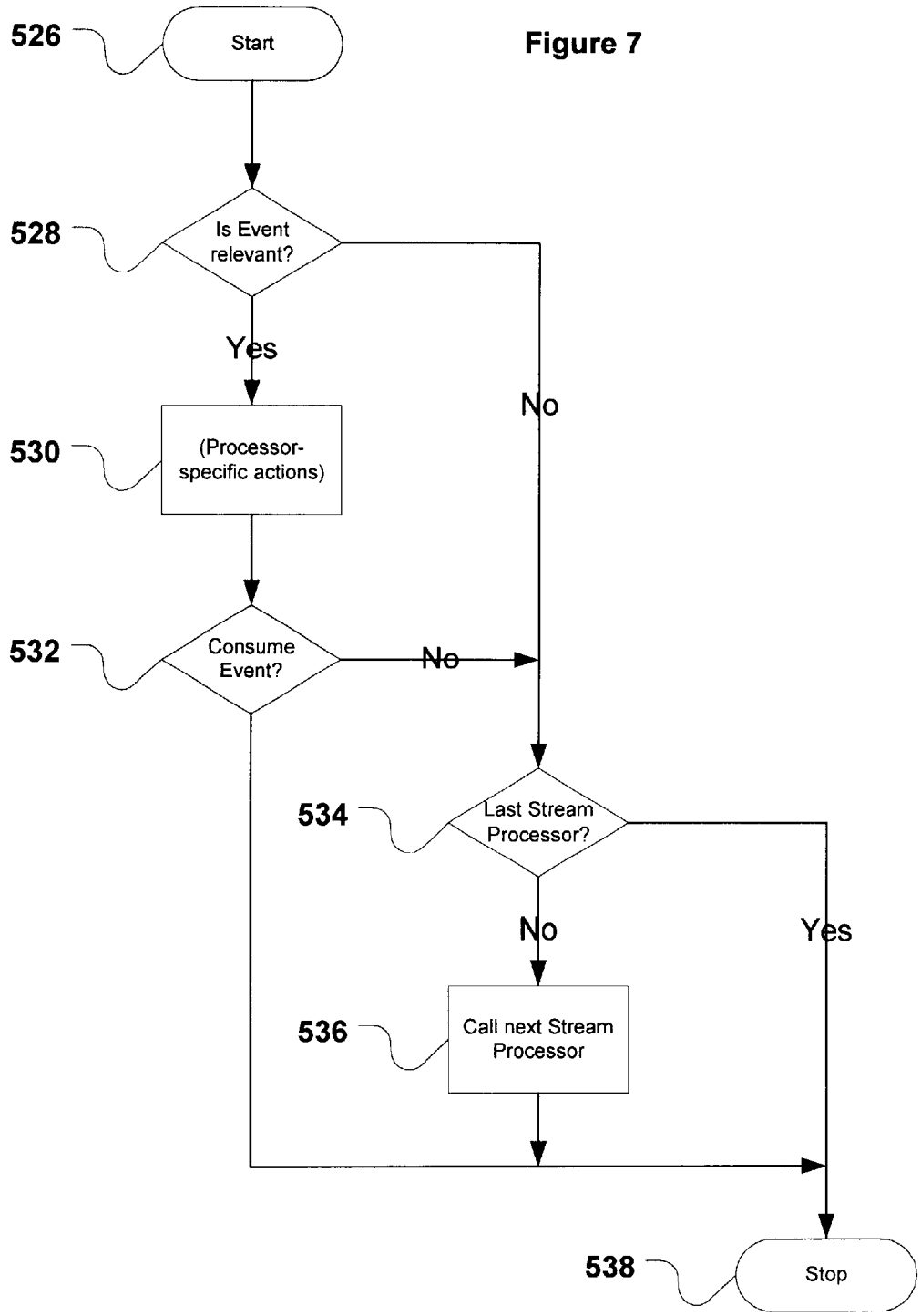
Figure 8:
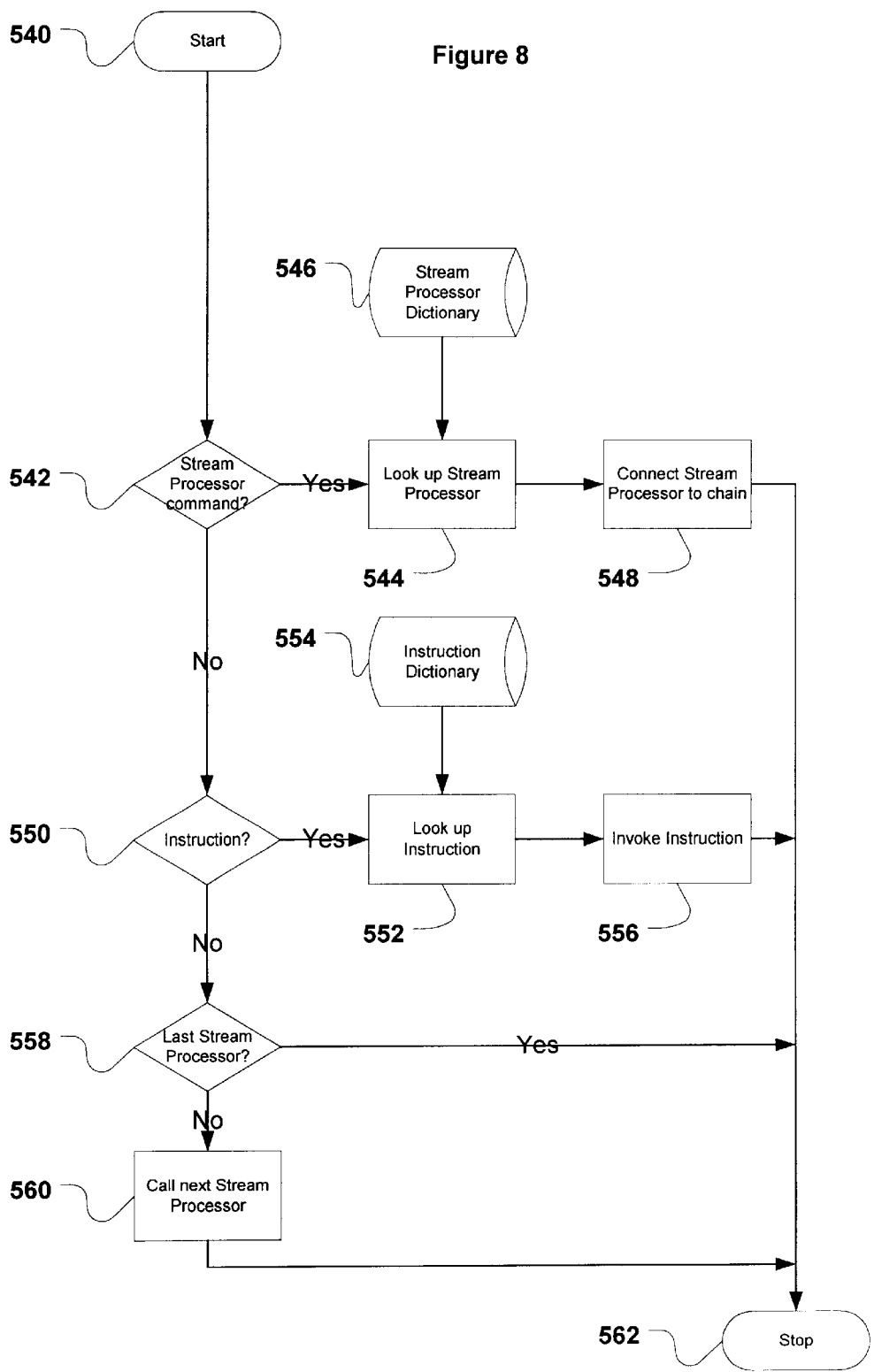

FIGS. 7, 8 and 9 show how Stream Processors work. Stream Processors receive events one at a time, so each flowchart shows how a Stream Processor handles a single event. FIG. 7 shows the general logic of any Stream Processor, and FIGS. 8 and 9 show the the details of two of the built-in Stream Processors.

In FIG. 7 the Stream Processor decides at step 528 whether the event is relevant for this Stream Processor. If it is, at step 530 it processes the event according to this Stream Processor's design. Step 532 determines whether this event is to be removed from the event stream, and if so the process ends. If step 528 determined the event was not relevant, or step 532 determined it should be passed on after processing, then step 534 determines whether another Stream Processor follows this Stream Processor in the Document Processor. If so, this Stream Processor calls the next Stream Processor at step 536 before the process ends.

In a typical configuration, the Stream Processor dictionary 211 may contain references to the following:
Stream Processor loader 208
Instruction Loader 207
Request Processor Loader 209
Instruction Interpreter 206
Transport Stream Processor 204
Interpreter Stream Processor 203

The Stream Processor dictionary 211 serves the entire XML Operating System. It might be kept on external storage so that it remains available after the operating system has been shut down and restarted. This capability is known as 'persistence'.

In a typical configuration the instruction dictionary 210 initially contains references to several groups of instructions.

Configuration instructions manage the state of the XML Operating System, especially at startup time.

Stream Processor Control instructions maintain the Stream Processor Dictionary.

Instruction Control instructions maintain the Instruction Dictionary.

Interpreter Control instructions manage the state of the Interpreter Stream Processor.

Request Processor Control instructions maintain the Request Processor Dictionary.

The instruction dictionary serves the whole XML Operating System, and may be persistent.

The functions and interactions of the loaders 209, 208 and 207 and the processors 206, 205, 204 and 203 of FIG. 3 are presented hereinbelow.

An Interpreter Stream Processor 203 detects commands and parameters in the event stream, initiates the appropriate actions, and may remove events from the stream.

An Interpreter Stream Processor recognizes constructs that conform to a specific syntax. When it encounters such a construct it looks for an entry in a Stream Processor dictionary 211. If there is a match, it directs the event stream to the corresponding Stream Processor. Example 5, presented hereinbelow, is an example of the Interpreter removing events. The instruction Interpreter Stream Processor 206 recognizes constructs that conform to the syntax for instructions. When it recognizes a potential instruction it looks for an entry in the instruction dictionary 210. If there is a match it initiates the corresponding action. In Example 4, presented hereinbelow, two instructions are invoked.

FIG. 8 shows the steps for processing one event by the Interpreters 203 and 206. At step 540, the process starts and thereafter, a determination is made at 542 as to whether or not the present event is a command to initiate a Stream Processor. If so, a search is performed at step 544, through the Stream Processor dictionary, for a Stream Processor. Thereafter, the found Stream Processor is connected to the chain of Stream Processors at step 548 and the process stops at 562.

If step 542 determined the event was not a Stream Processor command then step 550 determines whether the event is an instruction. If it is, the Interpreter loads the instruction Interpreter Stream Processor. The instruction Interpreter searches the Instruction dictionary at step 552 and the found instruction from the dictionary is invoked at step 556 and the process ends. Otherwise the event is passed to the next Stream Processor in the chain, if any (steps 558 and 560).

The Instruction Loader 207 reads an instruction from the event stream and installs the same in the instruction dictionary 210.

The built-in Stream Processor loader 208 reads information provided by the Stream Processor module from the event stream and installs it in the Stream Processor dictionary 211.

The Request Processor loader 209 reads a Request Processor from the event stream and installs the same in the Request Processor dictionary 108 (shown in FIG. 2).

Instructions, Stream Processors and Request Processors are patterns for executable modules that conform to published interfaces. Each pattern is encoded in an XML document for use by the corresponding loader 207, 208 or 209.

One or more user-defined Stream Processors, such as the user-defined Stream Processor 205, installed by the Stream Processor loader, are available from the stream dictionary 211 for use immediately.

In FIG. 3, the three 'loader' Stream Processors (loaders 209, 208 and 207) are part of the extension mechanism, which allows the operating system to grow and to adapt to different jobs.

An analogy may clarify the mechanism. Consider the case where a clerk in an office processes incoming paper documents according to a set of printed instructions pinned to the wall. One set of instructions explains what to do with paper documents containing new instructions. From time to time, a paper document arrives which contains new instructions. The clerk pins the instruction sheet on the wall along with previous instructions, then carries on processing paper documents, perhaps using the new instructions.

Similarly, a loader is called in when the Interpreter detects a new Stream Processor, Request Processor or instruction in the stream. The loader saves the pattern in the appropriate dictionary.

The built-in transport Stream Processor 204 converts the event stream into a character stream. Any Stream Processor may use the transport facilities of the XML Operating System. The Transport Stream Processor is a general-purpose Stream Processor which can be controlled by embedding commands in the event stream. It is provided as a convenient way for Stream Processors to use the transport facilities.

In FIG. 4, data flow is shown from a Stream Processor within the operating environment 10 (of FIG. 1), namely, Stream Processor 204, to a receiver outside the environment, namely the receiver 308. Any Stream Processor can collaborate with the Response Channel provider 303 to send a character stream to one or more destinations outside the environment.

The transport Stream Processor 204 detects commands inserted in the event stream by other Stream Processors. When it detects an open command, the transport Stream Processor requests a Response Channel 305 from the Response. Channel provider 303. There are also commands to suspend and resume output to one or more channels, and to close a channel. This allows overlapping or non-overlapping segments of the character stream to be distributed to more than one destination.

Example 7, presented hereinbelow, serves as an example of the transport Stream Processor writing to two channels at once.

The functions of the blocks shown in FIG. 4 are noted below:

The Response Channel provider 303 creates a Response Channel 305 to an entity identified by an address. The Response Channel can then be used to send information to the entity.

The address used to request the Response Channel from the Response Channel provider may be a transport specific address. A transport specific address identifies a transport protocol, and contains connection information in a protocol-specific format. An example of an SMTP protocol address is: "SMTP://router@xiam.com" and an example of a HTTP protocol address is "HTTP://router.xiam.com:81".

It is useful to identify an entity by an address which is not transport specific to allow the transport mechanism to be interchanged without changing the address of the entity. Such an address must be resolved to one or more transport specific addresses before a Response Channel can be created.

In this embodiment of the invention an address in the format "XMLR://xiam.com" is not transport specific, and the address resolver 302 transforms this address into a transport specific address. Each Response Channel is associated with a Transmitter Transport Adapter (306). Each Transport Transmitter Adapter can implement one or more protocols.

The Transport Transmitter Adapter connects to the receiver 308 (which may be a consumer) and transmits the character stream 307. The Transport Transmitter Adapter 306 may begin sending an XML stream while a Document Processor is still processing the event stream and while a Transport Receiver Adapter is still receiving a character stream.

In this embodiment of the invention, addresses which are not transport specific look like this:

XMLR://<domain>

The address resolver queries the XML machine's designated domain name server for TXT records for the domain in the address. All TXT replies that conform to the address response format are parsed to extract protocol addresses. The Address response format is XMLR:<preference number>:<protocol address>

The preference number indicates the order of preference for each protocol address. The lower the preference number the higher the preference.

The Response Channel provider 303 provides a Response Channel 305 capable of delivering to the protocol address with the highest preference supported by the available Transport Transmitter Adapters 306, if any.

FIG. 9 shows the steps for processing one event by the transport Stream Processor. At step 570, the process starts and continues to 572 at which point, a determination is made as to whether the present event is an 'open' command and if so, the process continues to step 574 where a Response Channel is obtained. The channel is added to the channel list (step 576) and the active list (step 578) and the process ends.

If the present event is not an 'open' command, step 580 decides whether it is a 'close' command. If it is, the Stream Processor closes the Response Channel and removes it from the active list and from the channel list (steps 582, 584 and 586 respectively), and the process ends.

If a command has not been recognised yet, step 588 determines if the event is a 'pause' command. If so, step 590 removes the channel specified by the command from the active list and the process ends. Otherwise, step 592 decides if the event is a 'resume' command. If so, step 594 adds the specified channel to the active list.

If no command has been recognised, the transport stream adapter writes to the character stream in each of the channels in the active list (step 596).

Finally, the event is passed to the next Stream Processor in the chain, if any (steps 598 and 600).

EXAMPLES

A number of scenarios are presented below to serve as examples of some of the blocks and functions discussed hereinabove as follows:

As noted earlier hereinabove, referring back to FIG. 2, one or more stream senders 101 (outside the environment) produce or forward XML documents to the XML operating system as a character stream 102 using a transport protocol. An example of such a character stream is presented by Example 1 wherein the status of a flight originating in Dublin, at a time noted in the example with other respective parameters, is checked.

Example 1

```
<?xml version="1.0"?>
<?xml-stylesheet type="text/xsl" href="14-4.xsl"?>
  <FLIGHT-EVENT>
    <ORIGIN>DUB</ORIGIN>
```

-continued

```
    <FLIGHT-TIME>Wed Mar 22 06:20:03 GMT 2000</FLIGHT-TIME>
    <FLIGHT-NUMBER>EI123</FLIGHT-NUMBER>
    <DESTINATION>HTW</DESTINATION>
    <STATUS>ONTIME</STATUS>
    <ARRIVAL-TIME>08:00</ARRIVAL-TIME>
    <TERMINAL>1</TERMINAL>
  </FLIGHT-EVENT>
```

As earlier noted, an event stream is an ordered sequence of event routine calls, which represent a document. An example of an event stream related to that of Example 1 is presented by Example 2.

Example 2

```
setDocumentLocator
startDocument
processingInstruction: xml-stylesheet, type="text/xsl" href="14-4.xsl"
startElement: FLIGHT-EVENT
characters (5):
startElement: ORIGIN
characters (3): DUB
endElement: ORIGIN
characters (5):
startElement: FLIGHT-TIME
characters (28): Wed Mar 22 06:20:03 GMT 2000
endElement: FLIGHT-TIME
characters (5):
startElement: FLIGHT-NUMBER
characters (5): EI123
endElement: FLIGHT-NUMBER
characters (5):
startElement: DESTINATION
characters (3): HTW
endElement: DESTINATION
characters (5):
startElement: STATUS
characters (6): ONTIME
endElement: STATUS
characters (5):
startElement: ARRIVAL-TIME
characters (5): 08:00
endElement: ARRIVAL-TIME
characters (5):
startElement: TERMINAL
characters (1): 1
endElement: TERMINAL
characters (1):
endElement: FLIGHT-EVENT
endDocument
```

In Example 3, a private command with two arguments is inserted in the event stream. The private information happens to be a command to the transport Stream Processor to pause channel 'A'. An intepreter Stream Processor looks up 'xiam:channel' in the Stream Processor dictionary and passes the event stream to the transport Stream Processor as a result.

Example 3

```
startElement: xiam:channel, attributes (2) . . .
. . . attribute: command, CDATA, pause
. . . attribute: key, CDATA, A
endElement: xiam: channel
```

Example 4 contains an XML document in the form of a character stream. It contains two commands to be executed;

one with parameters and one without. The character stream will be converted to an appropriate event stream which is be interpreted by the instruction Interpreter Stream Processor. This Stream Processor will extract the relevant instruction name and parameters and invoke the instruction. The first command configures the address resolver (XARP) to use DNS Server 10.20.1.1 using the instruction named "Transport.XARP.Config". This instruction name appears in the Instruction Dictionary.

Example 4

```
<xiam:action name="Transport.XARP.Config">
        <parameter name="Type" value="DNS"/>
        <parameter name="DNSServer" value="10.20.1.1"/>
        <parameter name="Comment">
                Configure XARP
        </parameter>
</xiam: action>
<xiam:action name="Transport.StartAdapter.Transmitter.FILE"/>
```

Example 5 is an example of how the Interpreter removes events.

Example 5

```
setDocumentLocator                          setDocumentLocator
startElement: ALPHABET                      startElement: ALPHABET
startElement: xiam:channel, attributes      characters (0):
(2) . . .                                   startElement: LETTER
 . . . attribute: command, CDATA, pause     characters (0):
 . . . attribute: key, CDATA, A             endElement: LETTER
endElement: xiam: channel
characters (0):
startElement: LETTER
characters (0):
endElement: LETTER
```

Example 6 illustrates address resolution and an SMTP connection.

Example 6

A Stream Processor wants to send information to the organization Xiam and knows that the address for this organization is XMLR://xiam.com. It asks for a Response Channel, giving the address: XMLR://xiam.com The DNS (Domain Name Service) database for zone 'xiam.com' contains these resource records:

```
in   txt   "XMLR:10:http://xm1r1.xiam.com"
in   txt   "XMLR:20:http://xm1r2.xiam.com"
in   txt   "XMLR:20:http://xm1r3.xiam.com"
in   txt   "XMLR:30:smtp://xm1r@xiam.com"
in   mx    10 mail.xiam.com.
``` in mx 20 backup.isp.net.Assume that none of the Transport Transmitter Adapters installed in the XML operating system can send using HTTP, but there is one which can send using SMTP.

The Address Resolver bypasses the HTTP addresses in the DNS and returns the protocol address: SMTP://xmlr@xiam.com.

The adapter connects to port 25 (the default port for SMTP) on host mail.xiam.com, and initiates a message to the mailbox 'xmlr@xiam.com'.

The Response Channel Provider returns a Response Channel representing this connection to the Stream Processor.

Any information sent by the Stream Processor to this channel will be sent using SMTP.

When the Stream Processor closes the channel, the adapter ends the SMTP message and closes the connection.

Example 7

|  | | Example 7 | | | |
|---|---|---|---|---|---|
| Note | Interpreter Stream Processor | Distributor Stream Processor | Transport Stream Processor | Response Channel 1 | Response Channel 2 |
| 1 | start: xiam: distributor | | | | |
| 2 | start: memo | start: memo | start: open John | (open, to John) | (open, to Mary) |
|  |  |  | end: open | Memo! | Memo! |
|  |  |  | start: open Mary | | |
|  |  |  | end: open | | |
|  |  |  | start: memo | | |
|  |  |  | characters: | | |
|  |  |  | Memo! | | |
| 3 | start: priority | start: priority | | | |
|  | characters: Urgent | characters: | | | |
|  | end: priority | Urgent | | | |
|  |  | end: priority | | | |
| 4 | start: body | start: body | start: body | Lunch? | Lunch? |
|  | characters: Lunch? | characters: | characters: | | |
|  | end: body | Lunch? | Lunch? | | |
|  |  | end: body | end: body | | |

-continued

Example 7

| Note | Interpreter Stream Processor | Distributor Stream Processor | Transport Stream Processor | Response Channel 1 | Response Channel 2 |
|---|---|---|---|---|---|
| 5 | end: memo | end: memo | end: memo<br>start: close<br>John<br>end: close<br>start: close<br>Mary<br>end: close | (close) | (close) |
| 6 | end:<br>xian: distributor | | | | |

Example 7 illustrates event stream manipulation.
1. Interpreter responds to this event by directing the event stream to the Distributor Stream Processor, which it finds in the Stream Processor Dictionary. It consumes the start event.
2. Distributor responds to the start of a memo by directing the event stream to the Transport Stream Processor and inserting commands in the event stream. It inserts a title event too. Transport opens two Response Channels and writes the title to both.
3. The priority is not relevant, so Distributor removes these events from the stream.
4. The body of the memo passes through all the Stream Processors. Transport writes the text to both channels.
5. At the end of the memo Transport closes the channels.
6. Interpreter recognizes that Distributor is no longer required, and stops sending events to it.

The components of the environment shown in FIGS. 1–9 are implemented in software code in a preferred embodiment of the present invention. However, the same may be implemented in hardware without departing from the scope and spirit of the present invention.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. An operating system for use in networking environments to process information in the form of documents comprising:
   a. one or more transport receiver adapters for receiving the document as receiving character streams and for implementing one or more transport protocols, said transport receiver adapters receiving character streams from several sources simultaneously;
   b. an event source for generating structured information, based upon the received information, in the form of an event stream;
   c. one or more stream processors for processing the event stream including one or more events; and
   d. a transport transmitter adapter for connecting to a receiver to transmit the structured information in the form of a transmitting character stream,
   wherein the operating system is dynamic and flexible to handle a variety of protocols and to process various documents simultaneously.

2. An operating system as recited in claim 1 wherein the information received by the transport receiver is an Extensible Markup Language (XML) document.

3. An operating system as recited in claim 2 wherein an XML sender transmits the XML document as a character stream for receipt by the one or more transport receiver adaptors using a transport protocol.

4. An operating system as recited in claim 3 wherein the one or more transport receiver adaptors receives the receiving character stream and upon the beginning of receipt thereof, allocates a request channel to represent the receiving character stream.

5. An operating system as recited in claim 4 wherein the request channel allows request processors to read the receiving character stream without knowing details of the transport protocol.

6. An operating system as recited in claim 4 wherein a request channel is created when the document is received by the one or more transport receiver adaptors.

7. An operating system as recited in claim 6 wherein a plurality of request channels represent a plurality of character streams, each character stream being associated with a unique document and the documents being processed at different stages.

8. An operating system as recited in claim 6 wherein the request channel searches for and finds a request processor for processing of the character streams wherein the operating system supports any number of request processors, each said request processors enhancing the environment's ability to process request channels and further wherein request processors are added dynamically at any time.

9. An operating system as recited in claim 4 wherein the request channel is discarded when the document has been processed.

10. An operating system as recited in claim 4 wherein the one or more transport receiver adaptors passes the represented character stream to a request channel handler.

11. An operating system as recited in claim 10 wherein a request processor handler selects a request processor to be allocated to a particular request channel, the request processor then processing the represented character stream.

12. An operating system as recited in claim 11 wherein the request processor is an event source that converts the processed character stream into an event stream for further processing.

13. An operating system as recited in claim 4 wherein a particular one or more of the stream processors calls another one or more of the stream processors.

14. An operating system as recited in claim 4 including two or more event sources, each for generating an event stream, for processing two or more documents simultaneously.

15. An operating system as recited in claim 14 wherein each document is processed by a different stream processor.

16. An operating system as recited in claim 14 wherein each document is processed by different instances of the same stream processor.

17. An operating system as recited in claim 1 wherein the transport transmitter adapter transmits a first character stream while one of the one or more stream processors processes an event stream associated with a second character stream and further while the transport receiver adapter receives a third character stream.

18. An operating system as recited in claim 1 including dictionaries having patterns or references to patterns for making instances of the one or more stream processors for each of the received documents.

19. An operating system as recited in claim 18 wherein the instances are created on demand.

20. An operating system as recited in claim 18 wherein one of the dictionaries is a stream processor dictionary stored externally to the operating system.

21. An operating system as recited in claim 1 wherein each of the one or more stream processors responds to an event in an event stream by detecting structures, patterns, names or keywords within the event; inserting new events into the event stream; removing events from the event stream; replicating the event stream or parts thereof, directing each event to several stream processors; communicating with or participating in an external system; altering the configuration of the document processor; or invoking build-in or user-defined commands.

22. A method for using an operating system in networking environments to process information in the form of documents comprising:

receiving the information to be processed, in the form of receiving character streams, for implementing one or more transport protocols, said receiving character streams being received from several sources simultaneously;

generating structured information, based upon the received information, in the form of an event stream;

selecting one or more stream processors for processing the event stream including one or more events; and transmitting the structured information, in the form of a character stream, to a receiver, wherein the operating system is dynamic and flexible to handle a variety of protocols and to process various documents simultaneously.

* * * * *